United States Patent [19]

Chee et al.

[11] Patent Number: 5,673,416
[45] Date of Patent: Sep. 30, 1997

[54] MEMORY REQUEST AND CONTROL UNIT INCLUDING A MECHANISM FOR ISSUING AND REMOVING REQUESTS FOR MEMORY ACCESS

[75] Inventors: Lawrence Chee; David Tucker, both of Vancouver, Canada

[73] Assignee: Seiko Epson Corporation, Tokyo, Japan

[21] Appl. No.: 485,876

[22] Filed: Jun. 7, 1995

[51] Int. Cl.$^6$ .................................................. G06F 13/14
[52] U.S. Cl. ........................ 395/478; 395/481; 395/877; 364/239.6; 364/242.91; 364/242.7
[58] Field of Search ....................... 395/162–63, 164–66, 395/200.08, 250, 733, 800, 872, 877, 474, 478, 115–116, 507, 509–511, 513, 436, 481, 732; 345/27, 196–197; 365/189.05, 189.07, 189.12

[56] References Cited

U.S. PATENT DOCUMENTS

| 4,285,038 | 8/1981 | Suzuki et al. | 395/877 |
| 4,378,588 | 3/1983 | Katzman et al. | 395/877 |
| 4,486,854 | 12/1984 | Yuni | 395/427 |
| 4,847,812 | 7/1989 | Lodhi | 365/221 |
| 4,942,553 | 7/1990 | Dalrymple et al. | 395/250 |
| 5,249,271 | 9/1993 | Hopkinson et al. | 395/250 |
| 5,293,474 | 3/1994 | Patil et al. | 395/148 |
| 5,295,246 | 3/1994 | Bischoff et al. | 395/250 |
| 5,329,615 | 7/1994 | Peaslee et al. | 395/162 |
| 5,329,630 | 7/1994 | Baldwin | 395/497.04 |
| 5,337,410 | 8/1994 | Appel | 395/162 |
| 5,371,849 | 12/1994 | Peaslee et al. | 395/162 |
| 5,473,756 | 12/1995 | Traylor | 395/250 |
| 5,500,939 | 3/1996 | Kurihara | 395/163 |

FOREIGN PATENT DOCUMENTS 0 369 773  5/1990  European Pat. Off. .

OTHER PUBLICATIONS

Mar. 18, 1997 Written Opinion under PCT Rule 66 from IPEA/EPO.

Primary Examiner—Lance Leonard Barry, Esq.
Attorney, Agent, or Firm—W. Glen Johnson

[57] ABSTRACT

The present invention is directed to a display FIFO module for use in DRAM interface that includes a DRAM controller sequencer which prioritizes requests for DRAM access received from various modules, such as a CPU, a blit engine module, and a half frame buffer logic module, etc. The display FIFO module is connected between the DRAM controller sequencer and a display pipeline which is connected to a display device. The display FIFO module issues low and high priority requests for DRAM access to the DRAM controller sequencer for loading the FIFO with display data to be transferred to the display device. The low priority request is issued at the earliest time when the display FIFO is capable of accepting new data without overwriting unread data. This is determined by comparing the FIFO data level against a predetermined low threshold value. The low priority request is issued when the FIFO data level falls below or is equal to the low threshold value. A high priority request is issued when the FIFO mug receive new data or FIFO underrun will occur. This is determined by comparing the FIFO data level against a predetermined high threshold value. The high priority request is issued when the FIFO data level falls below or is equal to the high threshold value.

27 Claims, 7 Drawing Sheets

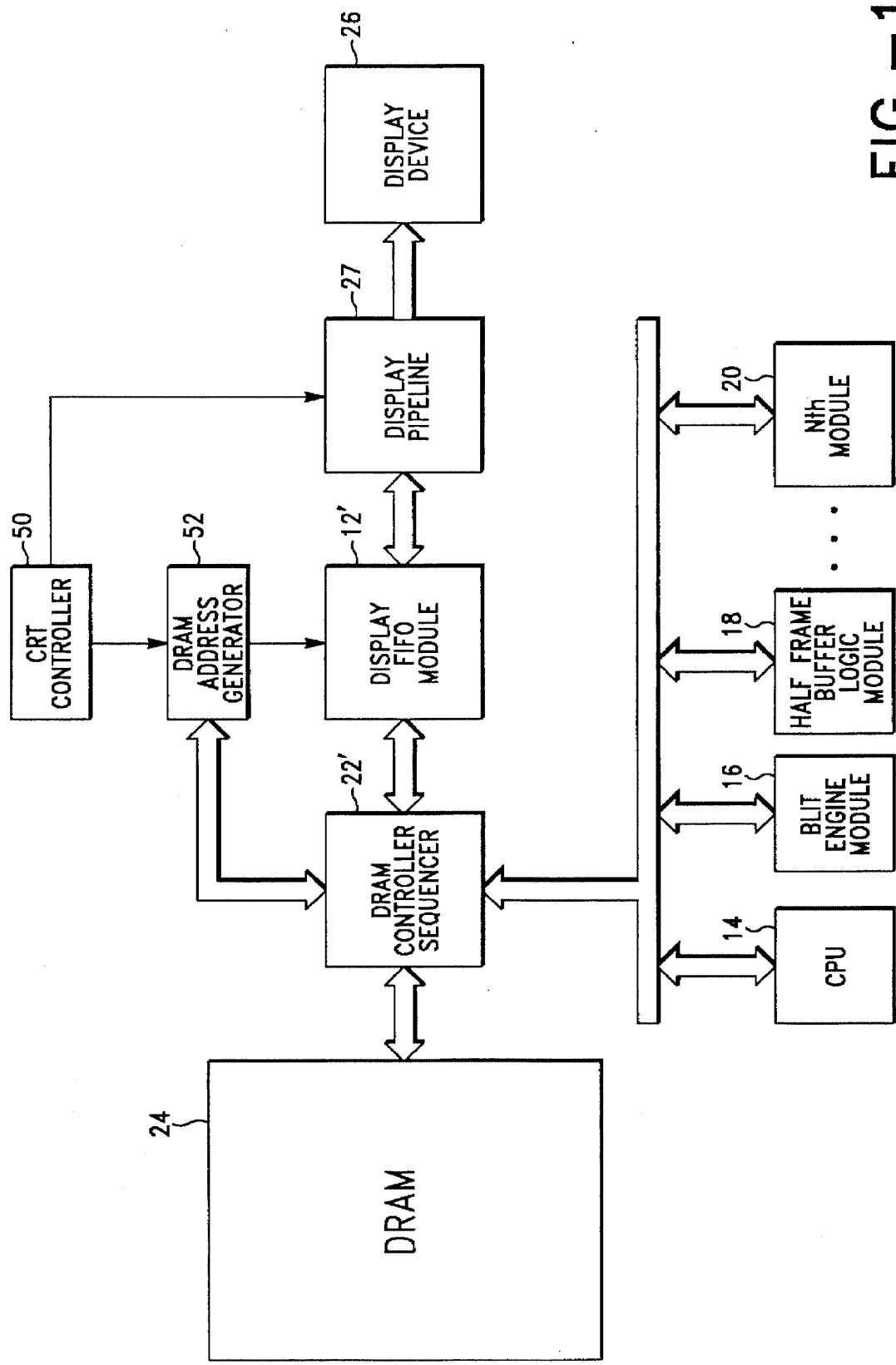
FIG.−1A
(PRIOR ART)

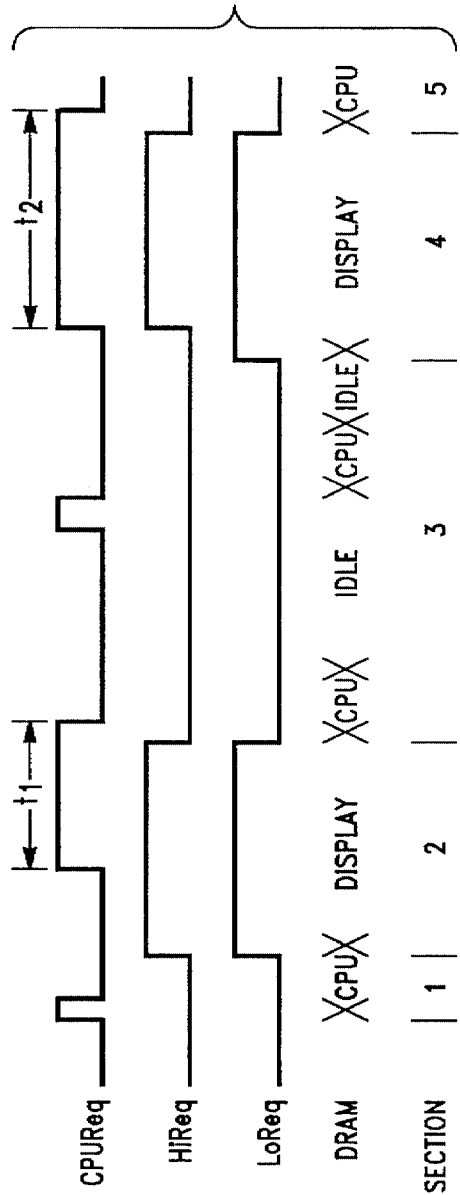
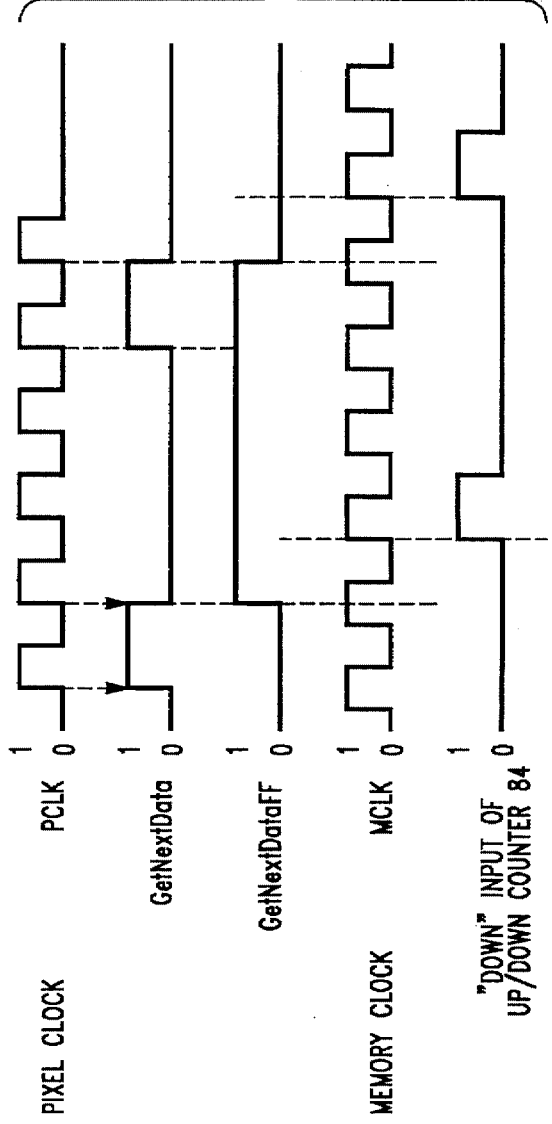

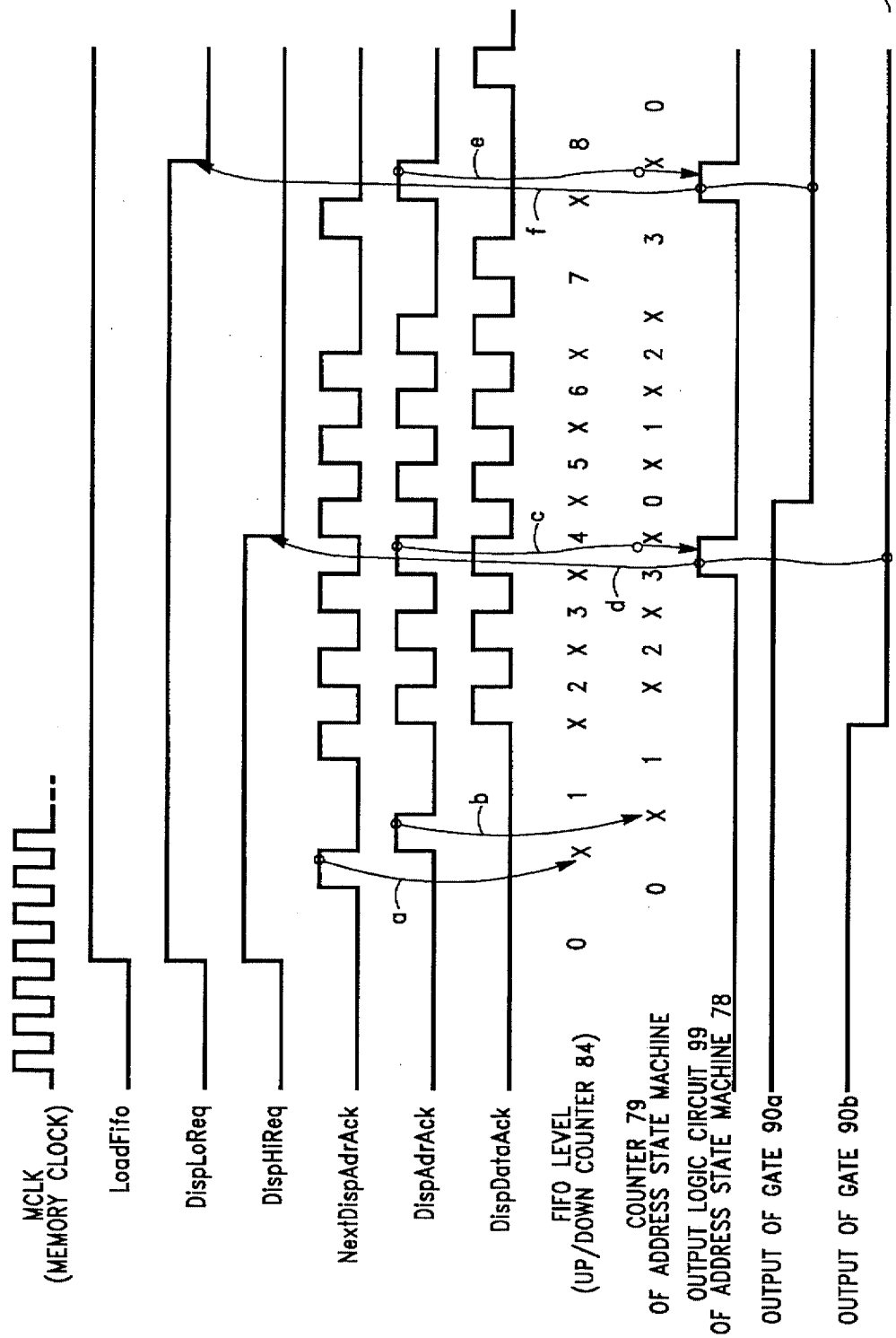

MEMORY REQUEST AND CONTROL UNIT INCLUDING A MECHANISM FOR ISSUING AND REMOVING REQUESTS FOR MEMORY ACCESS

BACKGROUND OF THE INVENTION

This invention relates to first-in-first-out (FIFO) memory devices and more particularly to a display FIFO module that issues requests for display data to a dynamic random access memory (DRAM) controller sequencer which prioritizes DRAM access requests received from various modules.

In a DRAM interface, as shown in FIG. 1A, a plurality of modules, including a display FIFO 12', a CPU 14, a blit engine module 16, a half frame buffer logic module 18, and other modules, such as an nth module 20 are connected to a DRAM controller sequencer 22' which decides which one of the modules should be granted the access to a DRAM 24. The blit engine module controls block transfer of bitmap images to, from or within the DRAM. The half frame buffer logic module supports image display on a dual scan LCD panel. A DRAM address generator 52 is connected to DRAM controller sequencer 22' and display FIFO module 12'. The DRAM address generator generates DRAM addresses to the DRAM controller sequencer. A CRT controller 50 controls DRAM address generator 52 and display pipeline 27. The CRT controller instructs the DRAM address generator when to start loading the FIFO. Display FIFO module 12' is connected between the DRAM controller sequencer 22' and a display pipeline 27 which is connected to a display device 26 such as a cathode ray tube (CRT) or liquid crystal display (LCD). Display FIFO module 12' is used for receiving and storing display data for the display device. When a conventional FIFO in the display FIFO module is used to store display data received from DRAM 24, a FIFO overrun may occur in which new data being transferred to the FIFO exceeds its capacity. Accordingly, some unread data in the FIFO will be overwritten by the new data. Also, a FIFO underrun error may occur when the FIFO runs out of display data and unintended or stale data will be displayed on the display device. It is imperative to prevent both FIFO overrun and underrun conditions from occurring. At the same time, it is also desirable to improve the efficiency of the interaction between the various modules connected to the DRAM controller sequencer and the display FIFO module. For example, the CPU should not have to wait long for DRAM access while the display FIFO module is being serviced by the DRAM controller sequencer.

In conventional devices such as that shown in FIG. 1A, display FIFO module 12' issues a low priority request for example, LoReq, when the FIFO is ready for accepting new data without overwriting unread data. The display FIFO module issues a high priority request for example, HiReq, when the FIFO must receive new data or FIFO underrun will occur. FIG. 1B shows how the CPU 14 interacts with display FIFO module 12'. In FIG. 1B, it is assumed that the FIFO has a capacity of eight data levels and the FIFO is always filled up with eight data elements at a time. It is also assumed that the DRAM controller sequencer has a priority system in which the high priority request HiReq is given the highest priority, the CPU request CPUReq is given the second highest priority and the low priority request LoReq is given the lowest priority. A request with higher priority can interrupt that with a lower priority.

As shown in FIG. 1B, in section 1, CPU 14 issues a CPU Request CPUReq to DRAM controller sequencer 22'. DRAM access is immediately granted to the CPU by the DRAM controller sequencer. In section 2, the display of a new line is about to begin. The CRT controller enables the display FIFO module via the DRAM address generator to start filling the FIFO. Display FIFO module 12' issues low and high priority requests LoReq and HiReq because the FIFO is completely empty at the beginning. The display FIFO module is serviced immediately by DRAM controller sequencer 22'. At the end of section 2, the FIFO is filled up with eight data elements and is therefore full. In section 3, after the FIFO is full, both high and low priority requests are removed by display FIFO module 12'. Thereafter whenever CPUReq is issued, DRAM access is immediately granted to the CPU. In between CPU accesses, the DRAM remains idle. In section 4, as data are read out of the FIFO and transferred to display device 26 through display pipeline 27, the FIFO is nearly depleted. Low priority request LoReq is issued. In conventional display FIFO modules, high priority request HiReq typically follows LoReq in a short time period, as shown in FIG. 1B. As a result, the CPU request is not serviced by the DRAM controller sequencer. At the end of section 4, the FIFO is filled up with eight data elements and is therefore full. Both LoReq and HiReq are removed. In section 5, the DRAM controller sequencer resumes giving CPU requests for DRAM access high priority.

As shown in FIG. 1B, there are long idle periods during which DRAM is not efficiently utilized, for example, in section 3. Furthermore, there are long waiting periods $t_1$ and $t_2$ in sections 2 and 4, respectively, during which the CPU has to wait for DRAM access. This results in inefficient CPU operations and slows down the computer system.

SUMMARY OF THE INVENTION

An object of the present invention is to improve the efficiency of the interaction between the CPU and the display FIFO module by decreasing the effective time period when a high priority request is active, thereby giving the CPU request a larger time window where it enjoys highest priority access to the DRAM.

Another object of the present invention is to utilize simple circuitry for the display FIFO module for efficiently determining when to issue requests for DRAM access.

The present invention is directed to a display FIFO module that issues low and high priority requests for DRAM access to a DRAM controller sequencer for loading the FIFO with display data to be transferred to the display device. The low priority request is issued at the earliest time when the FIFO is capable of accepting new data without overwriting unread data. This is determined by comparing the FIFO data level against a predetermined low threshold value. The low priority request is issued when the FIFO data level falls below or is equal to the low threshold value. A high priority request is issued when the FIFO must receive new data or FIFO underrun will occur. This is determined by comparing the FIFO data level against a predetermined high threshold value. The high priority request is issued when the FIFO data level falls below or is equal to the high threshold value. After a predetermined number of addresses have been latched by the DRAM controller sequencer to the DRAM for transferring data to the FIFO because of either the low or high priority request, or both, the display FIFO module reevaluates the FIFO data level to determine whether the data level is still below or equal to either the low or high threshold value. If the FIFO data level is still below or equal to the low threshold value, the low priority request remains active; otherwise, the low priority request will be removed by the display FIFO module. Similarly, if the FIFO data level is still below or equal to the high threshold value, the high priority request remains active; otherwise, the high priority request will be removed by the display FIFO module. The low and high priority requests are issued independently of each other. The independence guarantees that if the low priority request is unable to acquire sufficient access to the DRAM, the high priority request will be issued automatically to ensure FIFO integrity.

The display FIFO module of the invention includes a display FIFO, a read control circuit, and a write control circuit. The write control circuit includes a request generator, an address state machine, an address generator and a data state machine.

According to a first aspect of the invention, the read control circuit accepts request for display data from a display pipeline for transferring data to a display device. The read control circuit generates read addresses to the FIFO for reading data out of the FIFO.

According to a second aspect of the invention, an up/down counter in the request generator of the write control circuit keeps track of the FIFO data level so that when a data element is about to be loaded into the FIFO, the up/down counter increments by 1 and when a request for data is received by the read control circuit from the display pipeline, the up/down counter decrements by 1.

According to a third aspect of the invention, the request generator of the write control circuit compares the FIFO data level against a predetermined low threshold value. The request generator issues a low priority request to the DRAM controller sequencer for DRAM access when the FIFO data level falls below or is equal to the low threshold value. The request generator also compares the FIFO data level against a predetermined high threshold value. The request generator issues a high priority request to the DRAM controller sequencer for DRAM access when the FIFO data level falls below or is equal to the high threshold value. The low and high threshold values are preset in a threshold register. The threshold values are programmable and are preset depending on the display mode of the display device. By using preset threshold values, the request generator is simple and efficient in determining when to issue requests for DRAM access.

According to a fourth aspect of the invention, a counter in the address state machine of the write control circuit keeps track of the number of new data entered into the FIFO. The counter increments by 1 when a data element is about to enter the FIFO. When the counter reaches a predetermined number, an enable signal is sent to the request generator by an output logic circuit of the address state machine and the counter is reset to zero and starts over.

According to a fifth aspect of the invention, upon receiving the output signal from the address state machine, the request generator reevaluates the FIFO data level by comparing the FIFO data level against the low and high threshold values. If the FIFO data level is below or equal to one or both of the threshold values, the corresponding request will remain active. On the other hand, however, if the FIFO data level is above one or both of the threshold values, the corresponding request or requests will be removed by the request generator.

Thus, according to the invention, once a request is made, it can be removed only after a predetermined number of addresses have been latched by the DRAM controller sequencer. The decision of whether the requests are to be removed or remain active is based on the FIFO data level compared against the threshold values.

In the present invention, the time during which the high priority request is active is reduced and the time during which the low priority request is active is increased. Thus, the efficiency of the interactions among a plurality of modules connected to a DRAM controller sequencer is improved. Idle periods during which DRAM is not efficiently utilized are reduced. Moreover, the CPU does not have to wait for long periods of time for DRAM access.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1A is a block diagram of a conventional DRAM interface including a conventional display FIFO module.

FIG. 1B shows the interaction between CPU requests and requests from a conventional display FIFO module;

FIG. 5 a timing diagram showing the input and output signals of the read control circuit with reference to the pixel clock and the "down" input signal of the up/down counter of the write control circuit with reference to the memory clock;

FIG. 6 shows a timing diagram illustrating the handshaking between the write control circuit and the DRAM controller sequencer;

DESCRIPTION OF THE PREFERRED EMBODIMENTS

Figure 2:
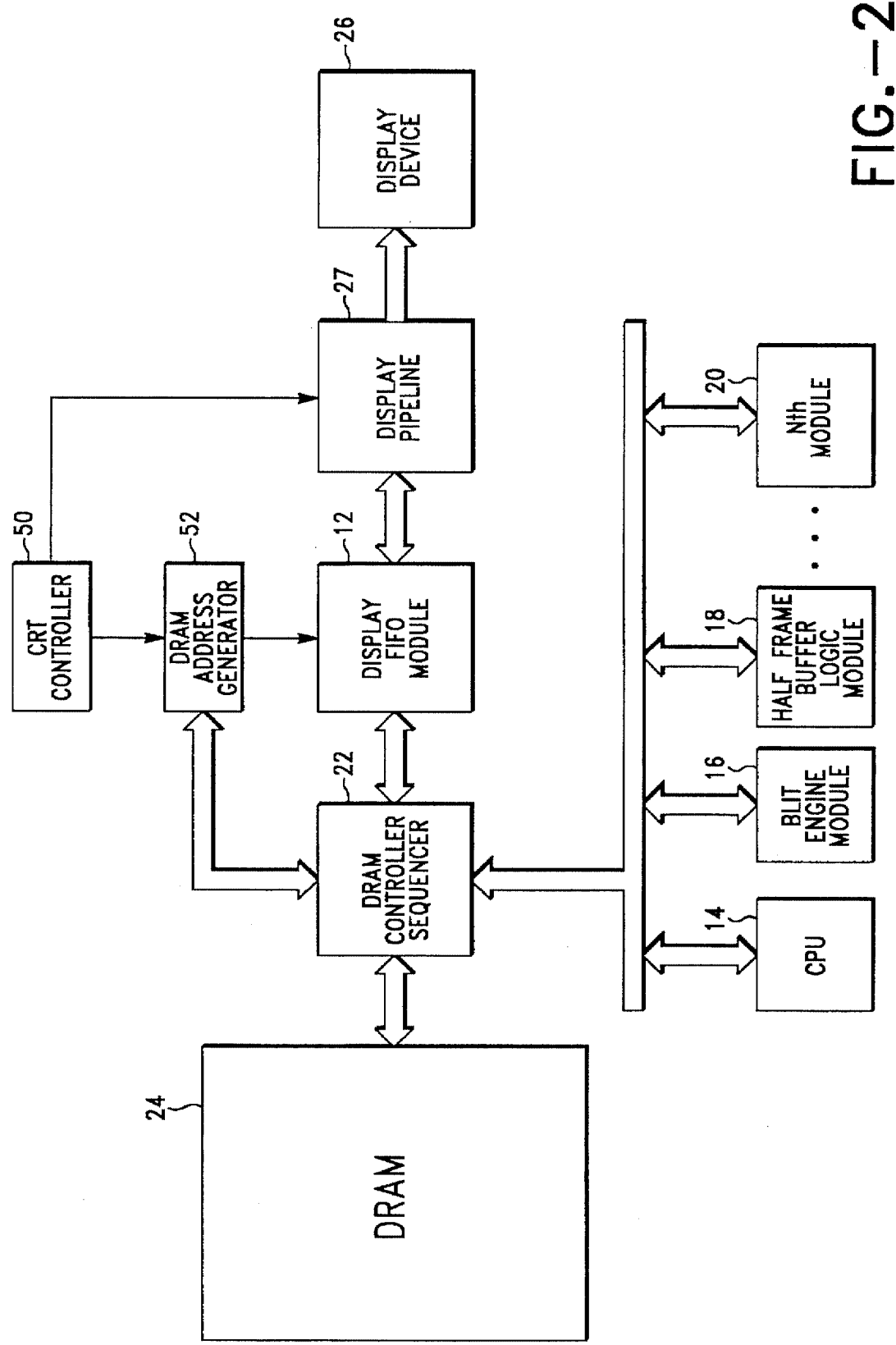
FIG. 2 is a block diagram of a DRAM interface having a number of modules, including the display FIFO module of the invention, connected to a DRAM controller sequencer.

FIG. 2 is a block diagram of a DRAM interface to illustrate the invention. In FIG. 2, like numerals are used to identify the identical elements which appear in FIG. 1A. As shown in FIG. 2, a display FIFO module 12, according to the present invention, is connected to a DRAM controller sequencer 22, along with CPU 14, blit engine module 16, half frame buffer logic module 18 and other modules, such an nth module 20. These various modules send requests to DRAM controller sequencer 22 for gaining access to DRAM 24. Based upon a priority system, DRAM controller sequencer 22 prioritizes the access requests received from these modules and decides which of these modules should be granted access to DRAM 24. Display FIFO module 12 sends requests to DRAM controller sequencer 22 for obtaining display data from the DRAM for displaying on display device 26, such as a CRT or a LCD display, through display pipeline 27. DRAM address generator 52 is connected to DRAM controller sequencer 22 and display FIFO module 12. CRT controller 50 controls DRAM address generator 52 and display pipeline 27. Display pipeline 27 is a conventional device for manipulating the display data and typically includes RAM DAC (digital-to-analog converter), a graphics controller, and an attributes controller, all of which are found in any VGA compatible graphics chips.

Figure 3:
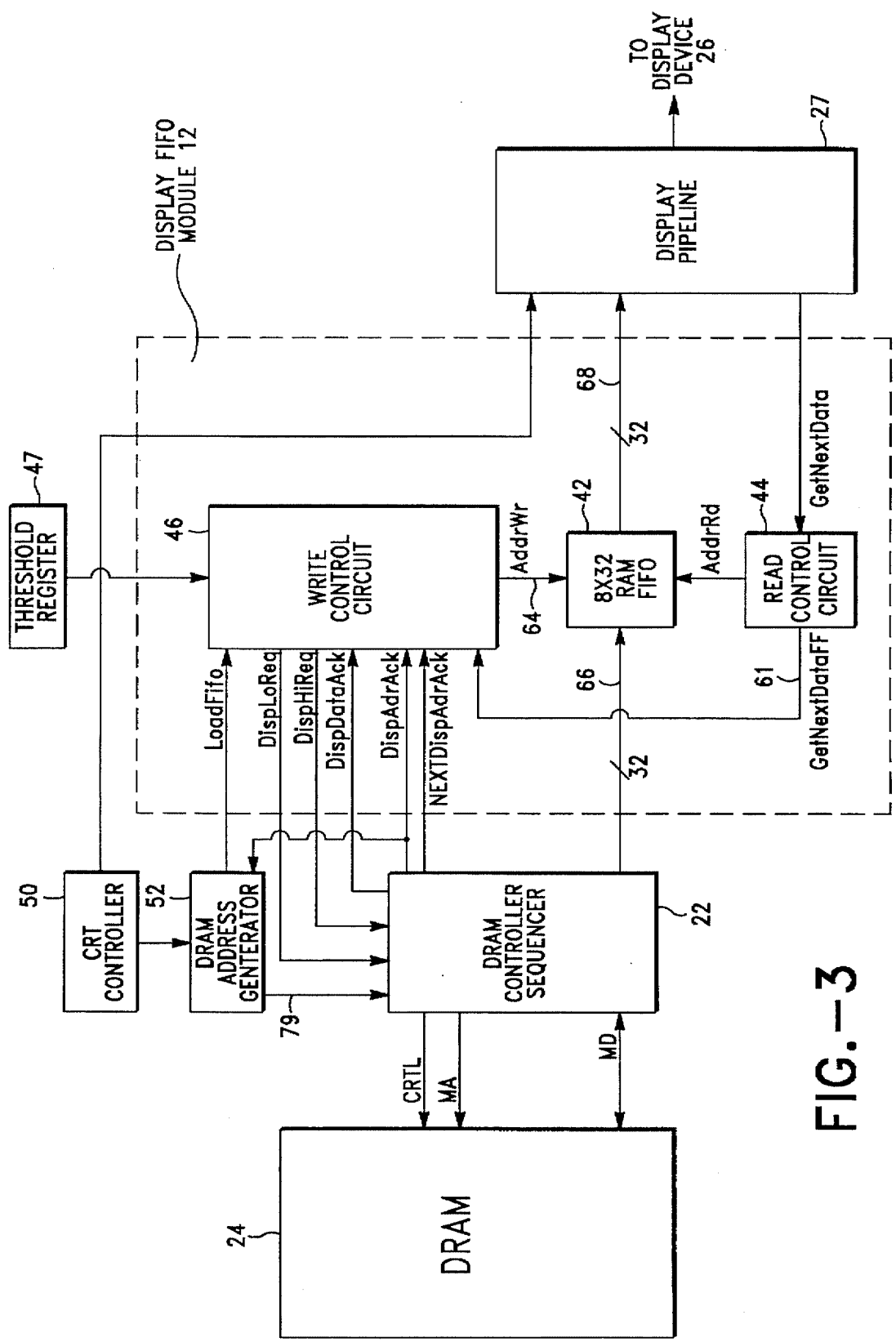
FIG. 3 shows a block diagram of the display FIFO module of the invention which is connected between the DRAM controller sequencer and the display pipeline.

FIG. 3 shows that display FIFO module 12 is connected between DRAM controller sequencer 22 and display pipeline 27. In display FIFO module 12, a FIFO 42 is connected to a read control circuit 44 and a write control circuit 46. FIFO 42 is also connected to display pipeline 27. In this embodiment, FIFO 42 comprises conventional RAM cells of 8×32 bits, i.e., FIFO 42 has a capacity of eight data levels. FIFO 42 receives display data from DRAM controller sequencer 22 through data bus 66 and outputs display data to display pipeline 27 through data bus 68. Of course, FIFO 42 can be of other dimensions. Read control circuit 44 accepts a request for display data, GetNextData, from display pipeline 27 and generates read address AddrRd to FIFO 42, for reading data out of the FIFO. Then read control circuit 44 sends a GetNextDataFF signal to write control circuit 46. Read control circuit 44 is driven by a pixel clock of the display device.

Write control circuit includes an up/down counter (not shown in FIG. 3). The up/down counter is used to keep track of the current data level in FIFO 42. The up/down counter is incremented when a data element is about to be written into the FIFO and decremented when a request for display data is received by the read control circuit from the display pipeline. A NextDispAdrAck signal received from DRAM controller sequencer 22 is supplied to write control circuit 46 to increment the up/down counter by 1 when a data element is about to be written into FIFO 42 through data lines 66. The GetNextDataFF signal received from read control circuit 44 decrements the up/down counter by 1 after a read address AddrRd is generated.

A threshold register 47, located in a register block which is programmed by CPU 14 via a local bus, provides predetermined low and high threshold values to write control circuit 46 for comparing with the data level of the FIFO represented by the output of the up/down counter in the write control circuit. Based upon the comparison, write control circuit 46 can issue two types of request for DRAM access: the low priority request and the high priority request. The low priority request is issued when the FIFO data level falls below or is equal to the low threshold value. This occurs at the earliest time when the FIFO is capable of accepting new data without overwriting unread data. The high priority request is issued when the FIFO data level falls below or is equal to the high threshold value. This occurs at the time when the FIFO must receive new data or FIFO underrun will occur. The low and high priority requests are issued independently of each other. The independence guarantees that if the low priority request is unable to acquire sufficient access to the DRAM, the high priority request will be issued automatically to ensure FIFO integrity. The low and high threshold values are preset in threshold register 47. The two threshold values are programmable depending on the display mode of display device 26, such as 16 color planar graphics mode, or 256 color packed pixel mode, etc. For a FIFO having a capacity of 8 data levels, the low threshold value has a range of 4 to 7; and the high threshold value has a range of 0 to 7. In one embodiment, the low threshold value is 4 and the high threshold value is 1.

Based upon the comparison of the FIFO data level against the threshold values, write control circuit 46 issues either a low priority request DispLoReq or a high priority request DispHiReq, or both, to DRAM controller sequencer 22 for DRAM access so that data can be loaded into FIFO 42. After a predetermined number of addresses have been latched to the DRAM for transferring data to the FIFO, the write control circuit reevaluates whether any pending requests should remain active or be removed, based on the comparison of the FIFO data level against the threshold values. Write control circuit 46 is driven by a memory clock of DRAM 24. The detailed operations will be described later.

CRT controller 50 defines the size of the display on the display device and controls the display timing on the display device. CRT controller 50 instructs DRAM address generator 52 when to start loading the FIFO. CRT controller 50 is a conventional cathode ray tube controller and can be used to control a LCD panel, as will be understood by those of ordinary skill in the art.

DRAM address generator 52 generates DRAM addresses to DRAM controller sequencer 22 through address bus 79 and a LoadFifo signal to write control circuit 46 for starting loading FIFO 42. As will be understood by those skilled in the art, DRAM address generator 52 is a conventional device and generates addresses for the DRAM data which correspond to the pixels on display device 26.

DRAM controller sequencer 22, which receives DispLoReq and DispHiReq from write control circuit 46, provides control signals such as RAS, CAS, WE signals via CTRL bus and memory addresses via MA bus to DRAM 24. DRAM controller sequencer 22 provides data received from other modules to the DRAM via MD bus and receives memory data MD from the DRAM via MD bus. DRAM controller sequencer 22 also sends a DispAdrAck signal to DRAM address generator 52 and write control circuit 46 to indicate that data from DRAM is about to be received. Additionally, DRAM controller sequencer 22 sends a DispDataAck signal to write control circuit 46 to indicate that the data from DRAM has been latched for transferring to the FIFO.

Figure 4:
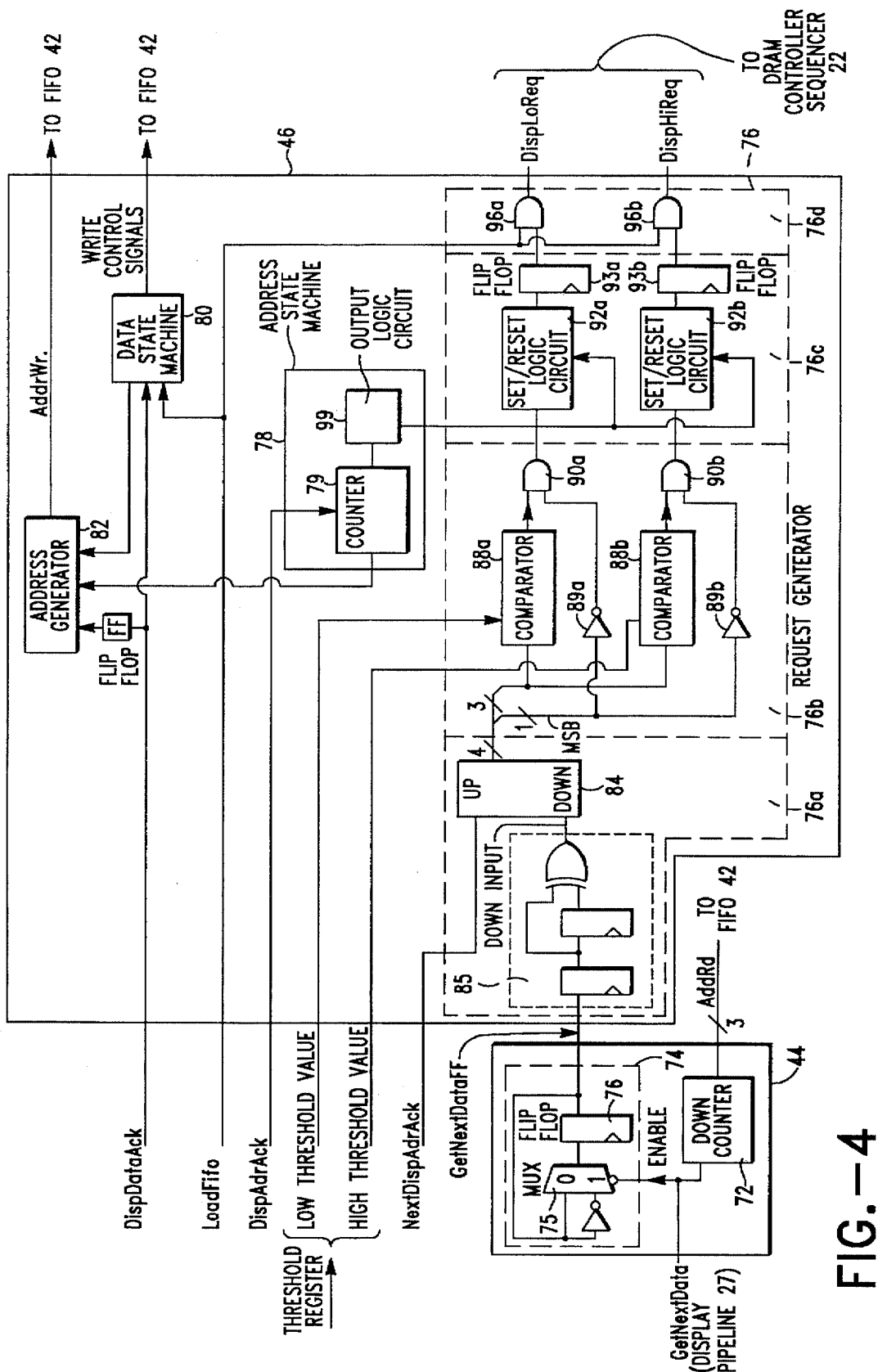
FIG. 4 is in detail the read and write control circuits of the display FIFO module according to the invention.

FIG. 4 shows read control circuit 44 and write control circuit 46 in detail. FIGS. 5 and 6 are timing diagrams for various signals of the read and write control circuits. FIGS. 4, 5 and 6 will be now described together. As shown in FIG. 4, read control circuit 44 includes a down counter 72 and a circuit 74. Down counter 72 receives a request for display data GetNextData, from display pipeline 27 and generates read address AddrRd for outputting to FIFO 42 for reading data out of the FIFO. Circuit 74 includes a multiplexer 75 connected to a flip flop 76. The GetNextData signal received from display pipeline 27 acts as an enable signal to multiplexer 75. The output of flip flop 76 is fed back to multiplexer 75 and is also sent to write control circuit 46 as a GetNextDataFF signal. The GetNextDataFF changes its state from logic 0 to logic 1 or logic 1 to logic 0 whenever the request for display data GetNextData from the display pipeline is issued as shown by the timing diagram in FIG. 5.

Write control circuit 46 includes a request generator 76, an address state machine 78, an address generator 82 and a data state machine 80. Request generator 76 includes four sections 76a, 76b, 76c and 76d. In section 76a, an up/down counter 84 is used to keep track of the data level of FIFO 42. This up/down counter was briefly described above. Up/down counter 84 increments by 1 whenever DRAM controller sequencer 22 sends an address acknowledge signal NextDispAdrAck to the "up" input of up/down counter 84, indicating that a DRAM address has been latched by the DRAM controller sequencer and a data element is about to be loaded into FIFO 42. The up/down counter decrements by 1 whenever read control circuit 44 sends the GetNextDataFF signal to the "down" input of up/down counter 84 through circuit 85 after receiving a request for display data from the display pipeline.

Clock synchronizing circuit 85, which is connected to the "down" input of up/down counter 84, comprises two latches and an exclusive OR gate. Circuit 85 generates a signal to decrement up/down counter 84 whenever the GetNextDataFF signal received from read control circuit 44 changes its state from logic 0 to logic 1, or from logic 1 to logic 0. The timing diagram of this "down" input of up/down counter 84 is also shown in FIG. 5. The output of up/down counter 84 has four bit lines. The most significant bit line, MSB, is used to distinguish between the condition when the FIFO is full and the condition when the FIFO is empty. The remaining three bit lines are used to represent the data level of the FIFO. Thus, when the FIFO is empty, the most significant bit line MSB, as well as all of the remaining three bit lines, is logic 0. When the FIFO is full, however, the MSB line is logic 1 while the remaining three bit lines are logic 0. Thus, before any data is read into the FIFO, all bit lines of the output of the up/down counter 48 are logic 0, including the MSB line.

Section 76b of request generator 76 includes comparators 88a and 88b, inverter 89a and 89b, and AND gates 90a and 90b. Comparator 88a compares the data level of FIFO 42, as represented by the three bit lines of the output of up/down counter 84, against the low threshold value supplied from threshold register 47. If the comparison shows that the FIFO data level is above the low threshold value, a logic 0 is generated by comparator 88a for sending to set/reset logic circuit 92a, indicating that FIFO 42 should not be loaded with new data at this time. On the other hand, if the comparison shows that the FIFO data level falls below or is equal to the low threshold value, a logic 1 is generated by comparator 88a for sending to set/reset logic circuit 92a, indicating that FIFO 42 is now capable of accepting new data without overwriting unread data. The output of comparator 88a is connected to an input of AND gate 90a. Inverter 89a has its output connected to the other input of AND gate 90a and its input connected to the MSB line of the output of up/down counter 84. The circuitry which comprises inverter 89a and AND gate 90a checks whether FIFO 42 is full, as indicated by the MSB line of the output of up/down counter 84 and, if the FIFO is full, negates the threshold comparison comparator 88a.

Similarly, comparator 88b compares the data level of FIFO 42, represented by the three bit lines of the output of up/down 84 counter, against the high threshold value provided by threshold register 47. If the comparison shows that the FIFO data level is above the high threshold value, a logic 0 is generated by comparator 88b, indicating that FIFO 42 does not have to be loaded with new data at this time. However, if the comparison shows that the FIFO data level falls below or is equal to the high threshold value, a logic 1 is generated by comparator 88b, indicating that the FIFO must receive new data or FIFO underrun will occur. The output of comparator 88b is connected to an input of AND gate 90b. Inverter 89b has its output connected to the other input of AND gate 90b and its input connected to the MSB line of the output of up/down counter 84. The circuitry which comprises inverter 89b and AND gate 90b functions in a similar manner. This circuitry checks whether FIFO 42 is full, as indicated by the MSB line of the output of up/down counter 84 and, if the FIFO is full, negates the threshold comparison of comparator 88b.

Section 76c of request generator 76 includes set/reset logic circuits 92a and 92b and flip flops 93a and 93b. Set/reset logic circuit 92a receives the comparison result from comparator 88a and an enable output signal from address state machine 78. If the comparison result is a logic 1, set/reset logic circuit 92a is set to logic 1 to issue a request signal through flip flop 93a, indicating that the FIFO data level is below or is equal to the low threshold value and the FIFO is now capable of accepting data without overwriting unread data. Once set, the request will not be removed by set/reset logic circuit 92a until the enable signal from address state machine 78 is active and the comparison result of comparator 88a is logic 0.

Set/reset logic circuit 92b functions in a similar manner as set/reset logic circuit 92a. Set/reset logic circuit 92b receives the comparison result from comparator 88b and the same output signal from address state machine 78 as that received by set/reset logic circuit 92a. If the comparison result from comparator 88b is logic 1, set/reset logic circuit 92b is set to logic 1 to issue a request signal through flip flop 93b, indicating that the FIFO data level is below or is equal to the high threshold value and the FIFO must receive new data or FIFO underrun will occur. Once set, the request will not be removed by set/reset logic circuit 92b until the enable signal from address state machine 78 is active and the comparison result of comparator 88b is logic 0.

Section 76d of request generator 76, as shown in FIG. 4, includes AND gates 96a and 96b. AND gate 96a receives the request signal from set/reset logic circuit 92a through flip flop 93a for generating the low priority request signal DispLoReq to DRAM controller sequencer 22. AND gate 96b receives the request signal from set/reset logic circuit 92b through flip flop 93b for generating the high priority signal request DispHiReq to DRAM controller sequencer 22. Both AND gates 96a and 96b also receive, as an input, a LoadFifo signal from DRAM address generator 52. Through AND gates 96a and 96b, the LoadFifo signal removes both the low and high priority requests when the display device is off or the display has reached the end of a line.

Address state machine 78 comprises a counter 79 and an output logic circuit 99. Counter 79 counts from 0 to a predetermined number, such as 3 and is then reset to start over from 0 to the predetermined number, 8 and so on. Counter 79 receives the DispAdrAck signal from DRAM controller sequencer 22. The DispAdrAck signal is an address acknowledge signal indicating that a DRAM address has been latched by the DRAM controller sequencer and a data element is about to be loaded into the FIFO. When the DispAdrAck signal becomes logic 1, counter 79 increments by 1. When DispAdrAck is logic 1 and counter 79 has counted to the predetermined number, 3 to indicate that a predetermined number of addresses, i.e., four addresses which is equal to half of the capacity of the FIFO, have been latched to the DRAM for transferring data from DRAM to the FIFO, a logic 1 is generated by output logic circuit 99 to cause set/reset logic circuit 92a to be reset if the output of gate 90a is logic 0 and cause set/reset logic circuit 92b to be reset if the output of gate 90b is logic 0.

At the beginning of the operation of loading data into the FIFO, the output of counter 79 and up/down counter 84 are initialized to 0. Set/reset logic circuit 92a is set to logic 1 because the comparison result from comparator 88a is a logic 1, indicating that the data level of FIFO 42 is below or is equal to the low threshold value. Thus, a request signal is issued through flip flop 93a. Thereafter, on every fourth count by counter 79, i.e., when counter 79 is counting from 3 to 0, a logic 1 is generated by output logic circuit 99 to indicate that four addresses have been latched to the DRAM for transferring data from DRAM to the FIFO. Set/reset logic circuit 92a now can be reset to logic 0 to remove the pending request signal if the comparison result from comparator 88b is logic 0. If, at this time, the comparison result is logic 1, set/reset logic circuit 92a is set to logic 1 to keep the request signal active.

Set/reset logic circuit 92b functions in a similar manner as set/reset logic circuit 92a. As described before, the request signals issued by set/reset logic circuits 92a and 92b are independent of each other.

As will be apparent to those of ordinary skill in the art, set/reset logic circuits 92a and 92b can be implemented with different circuits that perform the functions described above.

FIG. 6 is a timing diagram illustrating the handshaking between write control circuit 46 and DRAM controller sequencer 22. As previously described, the DispAdrAck is an acknowledge signal that indicates that the DRAM controller sequencer has latched an address to the DRAM for a data element to be received by FIFO 42. The NextDispAdrAck is the same as the DispAdrAck except that it is one clock earlier. The DispDataAck is an acknowledge signal that indicates that a data element has been latched by the DRAM controller sequencer from the DRAM and is ready to be received by the FIFO. In FIG. 6, it is assumed that the low threshold value is 4 and the high threshold value is 1. As illustrated by arrow a in FIG. 6, the NextDispAdrAck is used to increment the FIFO data level by incrementing up/down counter 84. The DispAdrAck is used to increment counter 79 of address state machine 78 to keep track of the number of addresses that have been latched by the DRAM controller sequencer to the DRAM, as illustrated by arrow b. Arrow c shows that when the DispAdrAck is a logic 1 and counter 79 has counted to 3, a logic 1 is generated by output logic circuit 99 of the address state machine. At this time, since the comparison result from comparator 90b is a logic 0, the high priority request DispHiReq is removed at the next clock, as illustrated by arrow d. Similarly, arrow e shows that when the DispAdrAck is a logic 1 and counter 79 has counted to 3, a logic 1 is generated by output logic circuit 99 of the address state machine. Since the comparison result from comparator 90a is a logic 0 at this time, the low priority request DispLoReq is removed at the next clock as illustrated by arrow f.

Address generator 82 of write control circuit 46 is composed of a down counter for generating write addresses AddrWr to FIFO 42. Address generator 82 receives a clock-delayed version of the DispDataAck signal from DRAM controller sequencer 22 and output signals from address state machine 78 and data state machine 80. The down counter of address generator 82 counts from 7 to 0 and starts over from 7 to 0 and so on. The down counter decrements by 1 whenever DispDataAck is logic 1 with one clock delay. The down counter is set to 7 when the output signals from both address state machine 78 and data state machine 80 are logic 0 and the LoadFifo signal is logic 0, which occurs at the end of a line in the display device.

Data state machine 80 is composed of a counter that counts from 0 to 3 and starts over from 0 to 3 and so on. Data state machine 80 receives the LoadFifo signal from DRAM address generator 52 and the DispDataAck signal from DRAM controller sequencer 22. Data state machine 80 generates write control signals to FIFO 42 for latching data into the FIFO. The LoadFifo signal instructs data state machine 80 when to begin loading data into FIFO 42. When LoadFifo signal is logic 0, it resets data state machine 80 to 0. The DispDataAck signal tells data state machine 80 that the DRAM data has been latched for transferring to the FIFO and the write control signals may now be generated. When DispDataAck signal is logic 1, the counter increments by 1.

Figure 7:
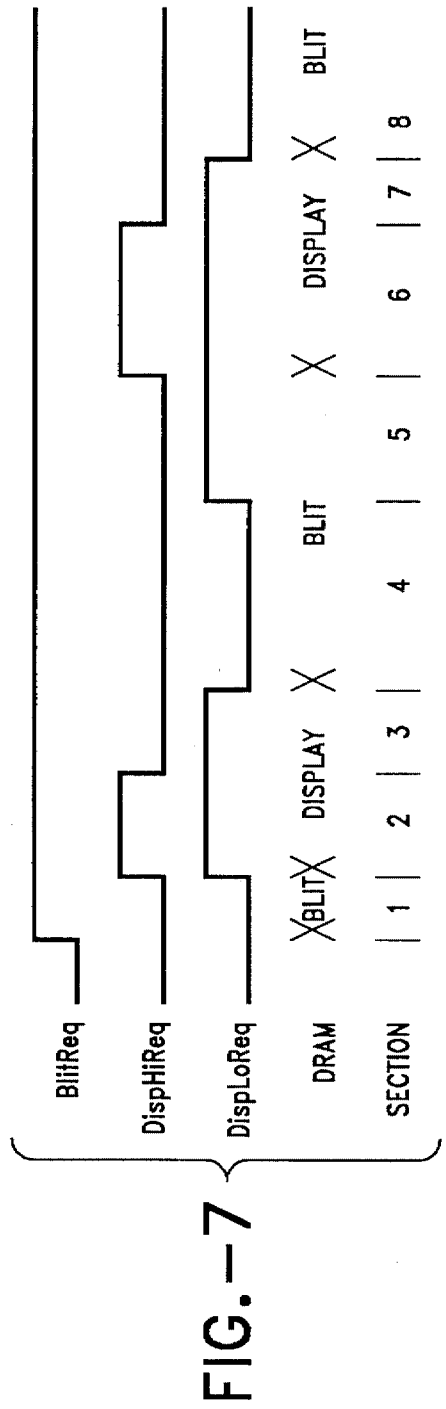
FIG. 7 shows the interaction between the blit requests BlitReq issued by the blit engine module and the low and high priority requests DispLoReq and DispHiReq issued by the display FIFO module of the invention.
Figure 8:
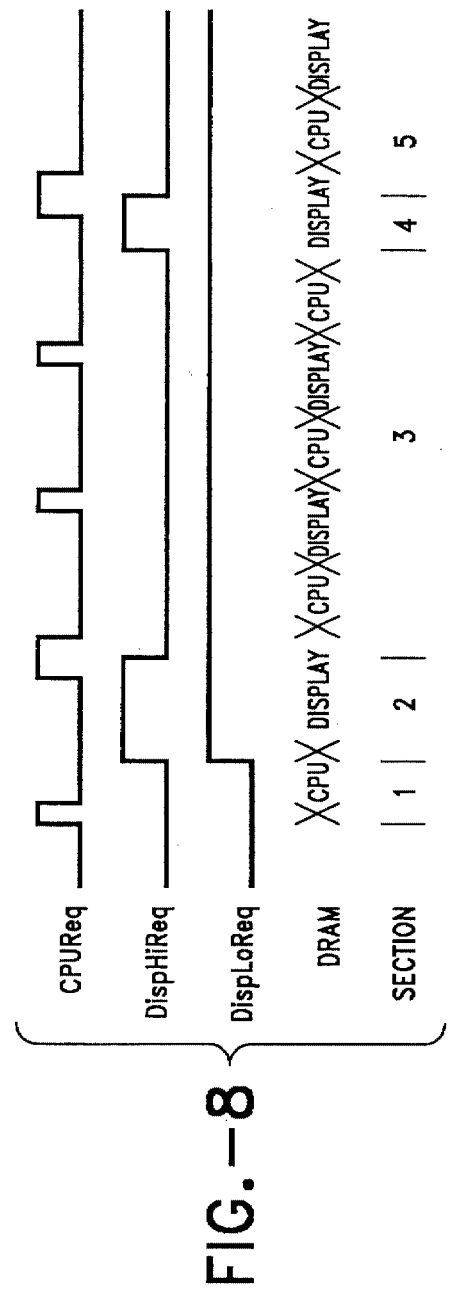
FIG. 8 shows the interaction between the CPU requests CPUReq issued by the CPU and the low and high priority requests DispLoReq and DispHiReq issued by the display FIFO module of the invention.

FIGS. 7 and 8 illustrate two examples in connection with the present invention. FIG. 7 shows how blit engine module 16 interacts with display FIFO module 12 in FIG. 2. In FIGS. 7 and 8, it is assumed that DRAM controller sequencer 22 has a priority system that is two tiered, upper tier UT and lower tier LT. The upper tier UT requests have a higher priority than the lower tier LT requests and require immediate attention. A UT request may interrupt a memory cycle if the serviced request has either a lower UT priority or is an LT request. An LT request cannot interrupt any memory cycle in progress, even if the owner of the memory cycle in progress has a lower LT priority. An LT request will only be granted memory access on two conditions: 1) when the owner of the current memory cycle removes its request, or there is no memory cycle, and 2) there are no higher LT priority requests or UT requests. UT requests, in order of priority, include the high priority request of display FIFO module 12, DispHiReq and the request of CPU 14, CPUReq. LT priority requests, in order of priority, includes the low priority request of display FIFO module 12, DispLoReq and the request of blit engine module 16, BlitReq. The DRAM controller sequencer which has the priority system described above is fully discussed in a patent application by the same inventors as the present application, docket number 111-078, which is filed on the same day as the present application and entitled "Computer System with Display", the disclosure of which is hereby incorporated by reference. Of course, to those of ordinary skills in the art a DRAM controller sequencer with other kinds of priority systems may also be used. For example, a DRAM controller sequencer that has a single tier priority system is also suitable for use with the present invention.

As illustrated in FIG. 7, in section 1, a blit request BlitReq is issued. DRAM access is granted to blit engine module 12 by DRAM controller sequencer 22. In section 2, the display of a new line is about to begin. The CRT controller enables the display FIFO module via the DRAM address generator to start filling the FIFO. Display FIFO module 12 issues low and high priority requests DispLoReq and DispHiReq because FIFO 42 is completely empty. Since DispHiReq is an upper tier priority request, DRAM access is taken away from the blit engine module and given to the display FIFO module. At the end of section 2, four data elements have been loaded into the FIFO and thus the display FIFO module is now half full. Now because the FIFO data level is above the high threshold value, DispHiReq is removed by the display FIFO module. In section 3, the low priority request DispLoReq remains active to continue filling the FIFO completely and efficiently without interruption since DispLoReq has a higher priority than BlitReq. In section 4, all display requests have been removed by the display FIFO module. BlitReq remains, and therefore the blit engine module receives DRAM access. In section 5, a low priority request DispLoReq is issued by display FIFO module 12 because the FIFO is ready to accept new data. Since DispLoReq is a lower tier request, it cannot interrupt any other request that is presently being serviced. The blit engine module retains DRAM access, receiving continuous uninterrupted access. In section 6, the FIFO is nearly depleted. A high priority request DispHiReq is issued by display FIFO module 12. Access by the blit engine module is interrupted and the display FIFO module is granted DRAM access. At the end of section 6, after four data elements have been loaded into the FIFO, the FIFO is now partially filled. Now the FIFO data level is above the high threshold value. As a result, the high priority request DispHiReq is removed by the display FIFO module. In section 7, the low priority request DispLoReq remains active to continue filling the FIFO as efficiently as possible. In section 8, after additional four data elements have been loaded into the FIFO, the FIFO is nearly full. As a result, the low priority request DispLoReq is removed by the display FIFO module. The blit engine module is now granted DRAM access by the DRAM controller sequencer. In this example, the FIFO is always filled in one continuous access, leaving the blit engine module with long, uninterrupted DRAM access between the cycles of filling the FIFO.

FIG. 8 shows how CPU 14 interacts with display FIFO module 12 in FIG. 2. As shown in FIG. 8, in section 1, a CPU request CPUReq is issued by the CPU. DRAM access is immediately granted to the CPU. In section 2, the display of a new line is about to begin. The CRT controller enables the display FIFO module via the DRAM address generator to start filling the FIFO. Display FIFO module 12 issues low and high priority requests DispLoReq and DispHiReq because the FIFO is completely empty. The display FIFO module is serviced immediately by the DRAM controller sequencer because DispHiReq has a higher priority than CPUReq. At the end of section 2, after four data elements are entered into the FIFO, the FIFO level is above the high threshold value. Thus DispHiReq is removed by display FIFO module 12, but the low priority request DispLoReq remains issued. Thereafter, in section 3, whenever CPUReq is issued, DRAM access is granted to the CPU immediately because CPUReq has a higher priority than DispLoReq. In between CPU accesses, the display FIFO module is serviced since DispLoReq remains active. In section 4, the FIFO is nearly depleted. The display FIFO module issues a high priority request DispHiReq. CPUReq is temporarily interrupted by the DRAM controller sequencer to service the display FIFO module. At the end of section 4, after four data elements are entered into the FIFO, the FIFO data level is above the high threshold value. Thus, DispHiReq is removed by display FIFO module 12. In section 5, the DRAM controller sequencer resumes giving CPUReq high priority and services the FIFO in between CPU requests. In this example, CPU requests are always serviced as soon as possible.

While the invention has been described in conjunction with several specific embodiments, it is evident to those skilled in the art that many further alternatives, modifications and variations will be apparent in light of the foregoing description. For example, the present invention may also be used in conjunction with a microprocessor and a direct memory access controller (DMA). Also, the various functional blocks can be implemented by those of ordinary skill in the art, using different circuits that perform the same functions as described in the application. Thus, the invention described herein is intended to embrace all such alternatives, modifications applications and variations as may fall within the spirit and scope of the appended claims.

What is claimed is:

1. In an information processor having a CPU in communication with memory, a memory request generation and control unit, comprising:

a memory request generator for issuing prioritized requests comprising first and second requests for data for loading into a first-in-first-out device (FIFO), comprising:

determining means for determining a FIFO data level of the FIFO;

first comparator means, responsive to said determining means, for comparing the FIFO data level against a predetermined first value;

second comparator means, responsive to said determining means, for comparing the FIFO data level against a predetermined second value lower than the first value, the second value representing a FIFO underrun threshold;

counter means for counting the number of data elements to be loaded into the FIFO and providing an output whenever a predetermined number has been counted;

first generator means, responsive to said first comparator means and said counter means, for issuing the first request for data when the FIFO data level falls below or is equal to the first value and for removing an issued first request for data when said counter means provides the output and the FIFO data level determined by said determining means is greater than the first value; and second generator means, responsive to said second comparator means and said counter means, for issuing the second request for data when the FIFO data level falls below or is equal to the second value and for removing an issued second request for data when said counter means provides the output and the FIFO data level determined by said determining means is greater than the second value; and a memory controller in communication with said memory request generator, the CPU, and memory for receiving and arbitrating among the first, second and a third request for data issued by the CPU according to a predetermined priority scheme.

2. The memory request generation and control unit of claim 1 wherein said counter means provides the output whenever the predetermined number equal to half of the capacity of the FIFO has been counted.

3. The memory request generation and control unit of claim 1 wherein the first and second values are programmable.

4. The memory request generation and control unit of claim 1 wherein the first value is preset such that when the FIFO data level falls below or is equal to the first value, the FIFO is capable of accepting data without overwriting unread data in the FIFO; and wherein the second value is preset such that when the FIFO data level falls below or is equal to the second value, the FIFO must receive data to avoid a FIFO underrun condition.

5. The memory request generation and control unit of claim 1 wherein said determining means includes an up/down counter which increments when a data element is to be loaded into the FIFO and decrements when a data element is to be output by the FIFO, such that the output of said up/down counter represents the FIFO data level.

6. The memory request generation and control unit of claim 1, wherein said memory controller assigns the first request for data a higher priority than the second and third requests for data to minimize FIFO underrun conditions.

7. The memory request generation and control unit of claim 6, wherein said memory controller assigns the third request for data a higher priority than the second request for data to minimize CPU data access delays in the absence of FIFO underrun conditions.

8. In an information processor having a CPU in communication with dynamic random access memory (DRAM), a memory request generation and control unit, comprising a memory request generator for issuing low and high priority requests for data to a dynamic random access memory (DRAM) controller sequencer for loading data from the DRAM into a first-in-first-out device (FIFO) for transfer to a display pipeline, said memory request generator comprising:

determining means for determining a FIFO data level of the FIFO;

first comparator means, responsive to said determining means, for comparing the FIFO data level against a predetermined low-priority threshold value;

second comparator means, responsive to said determining means, for comparing the FIFO data level against a predetermined high-priority threshold value, the high-priority threshold value indicative of a potential FIFO underrun condition;

counter means for counting the number of addresses that have been latched by said DRAM controller sequencer for sending to the DRAM and for providing an output whenever a predetermined number has been counted;

first generator means, responsive to said first comparator means and said counter means, for issuing a low priority request for data when the FIFO data level falls below or is equal to the low-priority threshold value and for removing an issued low priority request for data when said counter means provides the output and the FIFO data level determined by said determining means is greater than the low-priority threshold value; and second generator means, responsive to said second comparator means and said counter means, for issuing a high priority request for data when the FIFO data level falls below or is equal to the high-priority threshold value and for removing an issued high threshold request for data when said counter means provides the output and the FIFO data level determined by said determining means is greater than the high-priority threshold value;

wherein said DRAM controller sequencer is in communication with said memory request generator, the CPU, and DRAM for receiving and arbitrating among the first, second and a third request for data issued by the CPU according to a predetermined priority scheme.

9. The memory request generation and control unit of claim 8 wherein said counter means provides the output whenever the predetermined number equal to half of the capacity of the FIFO has been counted.

10. The memory request generation and control unit of claim 8 wherein the low-priority and high-priority threshold values are programmable.

11. The memory request generation and control unit of claim 8 wherein the low-priority threshold value is greater than the high-priority threshold value.

12. The memory request generation and control unit of claim 8 wherein the low-priority threshold value is preset such that when the FIFO data level falls below or is equal to the low-priority threshold value, the FIFO is capable of accepting data without overwriting unread data in the FIFO; and wherein the high-priority threshold value is preset such that when the FIFO data level falls below or is equal to the high-priority threshold, the FIFO must receive data to avoid a FIFO underrun condition.

13. The apparatus of claim 8 wherein said determining means includes an up/down counter which increments when an address has been latched by the DRAM controller sequencer for sending to the DRAM and decrements when receiving a request for reading data from the display pipeline, such that the output of said up/down counter coincides with the FIFO data level.

14. The memory request generation and control unit of claim 8, wherein said DRAM controller sequencer assigns the first request for data a higher priority than the second and third requests for data to minimize FIFO underrun conditions.

15. The memory request generation and control unit of claim 14, wherein said DRAM controller sequencer assigns the third request for data a higher priority than the second request for data to minimize CPU data access delays in the absence of FIFO underrun conditions.

16. A method for issuing prioritized requests comprising first and second requests for data for loading into a first-in-first-out device (FIFO) and arbitrating among the first, second and a third request for data issued by an information processor, comprising the steps of:

determining a FIFO data level of the FIFO;

comparing the FIFO data level against a predetermined first value;

comparing the FIFO data level against a predetermined second value less than the first value, the second value representing a FIFO underrun threshold;

counting the number of data elements to be loaded into the FIFO;

providing a control output whenever a predetermined number of data elements to be loaded into the FIFO has been counted;

issuing a first request for data when the FIFO data level falls below or is equal to the first value;

removing an issued first request when the control output is provided and the FIFO data level is greater than the first value;

issuing a second request for data when the FIFO data level falls below or is equal to the second value;

removing an issued second request when the control output is provided and the FIFO data level is greater than the second value; and arbitrating among the first, second and a third request for data issued by the CPU according to a predetermined priority scheme.

17. The method of claim 16 wherein in said step of providing a control output, the control output is provided whenever the predetermined number of data elements equal to half of the capacity of the FIFO has been counted in said counting step.

18. The method of claim 16 wherein said first and second values are programmable.

19. The method of claim 16, wherein said arbitrating step comprises assigning the first request for data a higher priority than the second and third requests for data to minimize FIFO underrun conditions.

20. The method of claim 19, wherein said arbitrating step further comprises assigning the third request for data a higher priority than the second request for data to minimize CPU data access delays in the absence of FIFO underrun conditions.

21. A CPU-driven data processing apparatus, comprising:
a memory;
a controller sequencer in communication with said memory;
a display first-in-first-out (FIFO) module in communication with said controller sequencer and comprising:
a first-in-first-out device (FIFO),
determining means for determining a FIFO data level of the FIFO, first comparator means, responsive to said determining means, for comparing the FIFO data level against a predetermined low-priority threshold value, second comparator means, responsive to said determining means, for comparing the FIFO data level against a predetermined high-priority threshold value, the high-priority threshold value indicative of a potential FIFO underrun condition, counter means for counting the number of addresses that have been latched by the controller sequencer for sending to said memory and for providing an output whenever a predetermined number has been counted, first generator means, responsive to said first comparator means and said counter means, for issuing a low priority request for data when the FIFO data level falls below or is equal to the low-priority threshold value and for removing an issued low priority request for data when said counter means provides the output and the FIFO data level determined by said determining means is greater than the low-priority threshold value, and second generator means, responsive to said second comparator means and said counter means, for issuing a high priority request for data when the FIFO data level falls below or is equal to the high-priority threshold value and for removing an issued high priority threshold request for data when said counter means provides the output and the FIFO data level determined by said determining means is greater than the high-priority threshold value;

a display pipeline coupled to said display FIFO module; and a display device, coupled to said display pipeline, for outputting the data, wherein said controller sequencer receives and arbitrates among the first, second and a third request for data issued by a CPU according to a predetermined priority scheme.

22. The apparatus of claim 21 wherein said counter means provides the output whenever the predetermined number equal to half of the capacity of the FIFO has been counted.

23. The apparatus of claim 21 wherein the low-priority and high-priority threshold values are programmable.

24. The apparatus of claim 21 wherein the low-priority threshold value is greater than the high-priority threshold value.

25. The apparatus of claim 21 wherein the low-priority threshold value is preset such that when the FIFO data level falls below or is equal to the low-priority threshold value, the FIFO is capable of accepting data without overwriting unread data in the FIFO; and wherein the high-priority threshold value is preset such that when the FIFO data level falls below or is equal to the high-priority threshold, the FIFO must receive data to avoid a FIFO underrun condition.

26. The apparatus of claim 21, wherein said controller sequencer assigns the first request for data a higher priority than the second and third requests for data to minimize FIFO underrun conditions.

27. The apparatus of claim 26, wherein said controller sequencer assigns the third request for data a higher priority than the second request for data to minimize CPU data access delays in the absence of FIFO underrun conditions.

* * * * *

UNITED STATES PATENT AND TRADEMARK OFFICE
CERTIFICATE OF CORRECTION

PATENT NO. : 5,673,416
DATED : September 30, 1997
INVENTOR(S) : Lawrence Chee, et al.

It is certified that an error appears in the above identified patent and that said Letters Patent is hereby corrected as shown below:

Title page, item 57, Abstract:

Line 18, change "mug" to --must--.

Signed and Sealed this

Thirteenth Day of January, 1998

Attest:

BRUCE LEHMAN

*Attesting Officer*    *Commissioner of Patents and Trademarks*